United States Patent Office 3,067,037
Patented Dec. 4, 1962

3,067,037
FOAMABLE PRODUCTS CONTAINING DIS-
INTEGRATED CELLULOSE CRYSTALLITE
AGGREGATES
Carl T. Herald, West Chester, Emanuel J. McGinley, Chester, and Orlando A. Battista, Drexel Hill, Pa., assignors to American Viscose Corporation, Philadelphia, Pa., a corporation of Delaware
No Drawing. Filed Dec. 2, 1960, Ser. No. 73,175
3 Claims. (Cl. 99—139)

This invention relates to foamable food products, such as toppings, and particularly to reduced calorie toppings incorporating cellulose crystallite aggregates as a non-nutritive quality-improving agent. Owing to the presence of the crystallite aggregates, a material obtained by the controlled acid hydrolysis of cellulose, the toppings not only have a reduced calorie content, which in itself is of importance, but also have other valuable characteristics, including form-retention or stand-up of the foamed topping, smoothness both in appearance and eating quality, and, despite the omission of fatty materials, a rich mouth feel. Unlike conventional toppings, the products described herein, after being foamed or extruded from aerosol containers, do not water off, or collapse, or coarsen on standing, i.e., develop a coarse texture.

Essentially, the invention comprises a foamable or whippable topping or other food comprising cellulose crystallite aggregates having a level-off D.P. (degree of polymerization), an edible foamable material, and water. A flavor may be added, also a sweetening substance, and, if desired, a creaming agent, usually a lipid material, to enhance the creaminess of the product. In addition, all of the ingredients, except the water, may be mixed to form a substantially dry free-flowing mix to which the water may be added subsequently and the entire mixture foamed or whipped.

Considering the ingredients in detail, it may be observed first that the cellulose crystallite aggregates, together with their properties and the manner of obtaining them, are described at length in the copending application of O. A. Battista, Ser. No. 33,941, filed June 6, 1960. For convenience, some salient features of such description are given here as follows, it being understood that the said application may be consulted for a more complete description. The aggregates are, as indicated, products obtained by the controlled acid hydrolysis of cellulose, there being formed an acid-soluble portion and an acid-insoluble portion. The latter comprises a crystalline residue or remainder which is water washed and recovered, being referred to as cellulose crystallite aggregates, or as level-off D.P. cellulose. These aggregates, in the state resulting from the hydrolysis and washing steps, in which state they may be designated as-formed aggregates, are then subjected to mechanical disintegration or attrition, as described below. It being apparent that the as-formed aggregates are the precursors of the disintegrated aggregates, the preparation and characteristics of the former will be described.

In the acid hydrolysis, the acid destroys or removes amorphous portions of the original cellulose chains, the remaining unattacked portions being in a particulate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reaction comprises the treatment of the original cellulosic material with 2.5 normal hydrochloric acid solution for 15 minutes at boiling temperature.

The cellulose undergoing the hydrolysis reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight, rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average chain length, or of average level-off D.P. values.

The hydrolysis methods noted are particularly characterized in that in each crystallite aggregate resulting from the hydrolysis, no constituent chain is connected to a chain in a neighboring aggregate; rather, all the chains in an aggregate are separate from and free of those in neighboring aggregates.

The cellulose crystallite aggregates, or level-off D.P. cellulose, suitable for use in the invention is characterized by having a preferred average level-off D.P. of 125 to 375 anhydroglucose units. Ideally, within this range all of the material should have the same D.P., or chain length, but as this is difficult if not impossible to achieve, it is preferred that at least 85% of the material have an actual D.P. not less than 50 and not more than 550. It may thus be apparent that the chain length of the level-off D.P. cellulose is very uniform, a consequence of the hydrolysis, wherein the longer chains of the original cellulose were converted to shorter chains and the very short chains were removed. As an example, reference to crystallite aggregates having an average level-off D.P. of 125 means that the aggregates have an average chain length corresponding to 125 anhydroglucose units, and at least 85% of this material is made up of chains containing 50 to 350 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash.

Other suitable cellulose crystallite aggregates may have lower average level-off D.P. values, say in the range of 60 to 125, or even 15 to 60. Aggregates from both of these ranges have the chemical purity and other characteristics noted above. Crystallite aggregates in the 60 to 125 average level-off D.P. range are obtainable from the acid hydrolysis of alkali swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

In every case the cellulosic source material has a D.P. greater than the level-off D.P. thereof.

As obtained from the acid hydrolysis and water washing steps, i.e., in their as-formed state, the aggregates in the overall average level-off D.P. range of 15 to 375 are in a loosely aggregated state and, particularly in the larger particle sizes, say from 40 to 250 or 300 microns, are characterized by the presence of many cracks in their surfaces, including similar surface irregularities or phenomena like pores, depressions, voids, fissures, and notches. Because of such irregularities, the apparent or bulk density of the aggregates is much less than their absolute density. In terms of lbs. per cu. ft., the bulk density of the aggregates may range from 7 or 8 to about 34 or 35 lbs./cu. ft.

The as-formed aggregates are further characterized by having a particle size in the over-all range of 1 or 2 to 250 to 300 microns, as determined visibly by microscopic examination. By subjecting the foregoing product to mechanical disintegration, there is produced a material having a size in the over-all range of less than 1 to about 250 or 300 microns, and as will be understood, the proportions of material in the lower size ranges will be increased over those of the non-disintegrated aggregates. It will also be understood that the particle size and size distribution may be selected to suit a particular end use.

Either before or after mechanical disintegration, preferably after, the aggregates may be dried.

Mechanical disintegration of the aggregates may be carried out in several ways, as by subjecting them to attrition in a mill, or to a high speed cutting action, or to the action of high pressures on the order of at least 5,000 or 10,000 p.s.i. The disintegration is preferably carried out in the presence of an aqueous medium. Whatever method is used, the disintegration is extensive enough so that the resulting disintegrated aggregates are characterized by forming a stable suspension in the aqueous medium in which they are being attrited, or in which they may be subsequently dispersed. By a stable suspension is meant one from which the aggregates will not settle out but will remain suspended indefinitely, even for periods measured in terms of weeks or months. As described hereinafter, at lower concentrations of aggregates, the suspension is a dispersion, while at higher concentrations it is a gel.

If the as-formed aggregates are not mechanically disintegrated, they will, upon being mixed with water, settle much like fine sand, and this is true if they are merely stirred in water. Furthermore, mechanical milling or grinding of the dry aggregates will not disintegrate them to a state where, without further treatment, they will disperse in water to form stable dispersions or gels.

The preferred disintegration method is to attrite the aggregates by means of a high speed cutting action in the presence of an aqueous medium. It is preferred that the water content of the mixture undergoing attrition should be at least 10, 15 or 20% by weight; and the aggregates content should be at least 3% by weight and desirably higher as the efficiency of the cutting action increases with the aggregates content. Suitable consistencies are those of mixtures containing up to about 35%, say, about 7 to 35%, by weight of aggregates and the balance water; such mixtures lend themselves well to good attrition, are convenient to handle, and have the advantage of directly producing a gel. At consistencies of 3 to 6% the attrited product is usually a dispersion but can be a gel, especially at 4 to 6% consistency. Attrition may be performed of mixtures of consistencies above about 35%, say from 35 to 70%, and although the attrited products are not gels, they have the distinctive property of forming indefinitely stable, smooth gels of varying thickness and striking appearance upon the addition of water and stirring manually, as with a spoon, for a few minutes. At about 70 to 80% consistency, attrition results in a damp but free flowing material comprising discrete grains or granules and clumps of grains; the moisture content is apparent to the touch rather than the eye; and the material forms a gel upon being manually stirred or beaten in water. At 80 to 90% consistency, the product of attrition is a crumbly, free flowing, grainy, dry-appearing material that does not have a damp feel and which requires energetic beating in the presence of water to form a gel.

Surveying briefly the characteristics of the dispersions and gels, they comprise attrited products of an attritable mixture having a solids content of at least 3% by weight during the attrition step. Necessarily, the resulting attrited product will also have at least 3% solids, although some useful materials are obtainable by diluting such attrited product. In the next place, at least 1% by weight of the solids in the product of attrition have a particle size of up to 1 micron. In the third place, the attrited product forms substantially adherent films, preferably substantially continuous and self-supporting films, when applied to suitable surfaces. Finally, the attrited product is, or forms, a stable and homogeneous colloidal dispersion or gel, the term "homogeneous" referring to the uniform visual appearance of the dispersion or gel. With respect to the last mentioned characteristic, it will be understood that stable, homogeneous, colloidal dispersions and gels, as contemplated herein, are free of layers or sediment; there is no bottom layer of sediment; nor is there a top layer of visibly lower solids content than the balance of the mixture. Rather, the stable dispersions and gels are uniform and homogeneous throughout; have a uniformly white color, some mixtures being more, or less, intensely white than others, depending on the aggregates content and particle size distribution; and are further characterized by having a very smooth butter-like mouth feel. The preferred dispersions and gels are those that are stable for at least a month, and another preferred group comprises those stable for at least a week. Dispersions and gels that are stable for at least a day, or even an hour or less, are also useful for some purposes, as where they are to be used almost immediately. But as may be apparent, the more stable dispersions and gels have the advantage of being storable for a considerable period of time.

For the purposes of the invention, a dispersion may be defined as having about 1 to about 8% by weight of the aggregate dispersed in the aqueous or other liquid, the latter constituting the continuous phase of the mixture. The dispersion has the physical form or appearance of a liquid, and is flowable like a liquid. A gel may be defined as having about 3 to 35% by weight of aggregates dispersed in the aqueous or other liquid, and in this case the aggregates constitute the continuous phase of the mixture. The gel has the physical form of a jelly, paste, plastic mass or the like. As noted, both dispersions and gels are included by the term suspension.

Following mechanical disintegration of the aggregates, the resulting product, whether a dispersion or gel, may be taken and used as such; or it may be de-watered and dried, or it may be desirable to fractionate it into fractions having a more homogeneous particle size and size distribution.

In respect of the drying of the gels, it should be observed beforehand that the preferred gels are those obtained by attriting the never-dried hydrolysis product; these gels have very desirable qualities in respect of smoothness, mouth feel, texture, etc. They may be dried to any practical moisture content, in which state they are redispersible in water, by the aid of a suitable attrition step, to form a gel, and this latter gel may again be dried if desired and again redispersed to form a subsequent gel.

Gels are also obtainable by attriting the dried hydrolysis product, and these gels may be dried, or dried and attrited to again form gels.

For producing the dried products, a number of drying procedures are available, and while redispersible materials result from each procedure, some procedures are more advantageous than others. For example, freeze drying, spray drying, drum drying, and drying by solvent displacement each produce a material which has an appreciably lower bulk density than conventionally oven-dried materials, with freeze drying producing the lowest bulk density, viz., 8 or 9 lbs./cu. ft. as against 14 lbs./cu. ft. for oven-dried aggregates; each produces a material which is more easily redispersible in water, by the aid of an attrition step, to form a stable suspension than air- or oven-dried materials; and each yields a more reactive product than air-dried or oven-dried products, as judged by acetylation with a conventional acetylating reagent mixture. Freeze-dried, spray-dried, drum-dried, and solvent displacement-dried materials are noticeably softer to the touch than products of the other drying steps; and freeze drying also produces the most porous products. With regard to the mouth feel of the various materials, those made by freeze drying and spray drying are superior.

Fractionation of the attrited products may be accomplished by means of such separation procedures as mechanical sifting, settling in water, or centrifuging, a number of useful fractions being obtainable, including fractions having a particle size of up to 0.2, 1, 2, 5, or 10 microns. Still another desirable fraction is one whose dimensions are all below 100 microns, or below 40 or 50 microns. Preferably, each dimension of the particles should be within the size range noted for each fraction; however, particles having two dimensions within the size range are quite useful, as are particles having but one dimension within the size range although they are less preferred.

Water is a preferred medium in which to disintegrate the crystallite aggregates. Other suitable media are aqueous mixtures comprising water and one or more water-miscible oxygen-containing, preferably hydroxy- and carbonyl-containing, compounds. Hydroxy compounds are a preferred class, particularly polyols, comprising aliphatic compounds having two or more hydroxy groups, of which glycerol is an example. Glycol ethers are suitable, as are water-miscible, low molecular weight alcohols. Other useful water-miscible compounds are those containing carbonyl groups, including organic acids, esters, aldehydes and ketones. Other compounds are ethers and oxides like ethylene oxide, propylene oxide, etc. Aqueous sugar solutions are useful. Water may be omitted from any of the foregoing aqueous mixtures and the non-aqueous compound itself, or mixtures of two or more thereof, may be employed as the medium.

In general, and as has been indicated, the aggregates may be attrited before being used to make up a food preparation, or, as illustrated below, they may be in a non-attrited condition, or in a non-attrited dried state, particularly if they have been dried by one of the preferred drying procedures noted, such as spray drying.

The amount of aggregates that may be used for preparing a foamable food is, of course, variable, depending on the food, its level of calorie content, the desired texture, etc.; but in general, the amount may suitably range from 5 to 20%, and preferably 9 to 11%, by weight of the food. Amounts as low as 1% are of course operable and will provide at least some of the auxiliary effects herein described, such as foam stability, whitening, moldability, etc.; however, as may be apparent, these effects are enhanced, and there is a greater calorie reduction, as the amount of aggregates in the food is increased.

The edible foamable material may be a protein or protein-containing source material, suitably the latter, which may be chosen from milk and milk products including whole milk, dried whole milk, milk powder, cream, superheated skim milk, condensed whole milk either sweetened or unsweetened, evaporated milk, dried milk, frozen milk, frozen cream, condensed skim milk sweetened or unsweetened, skim milk powder, fluid skim milk, condensed whey, and dried whey. Ice cream is suitable. Some of these materials supply not only protein but also fat, and thus may enhance the creaminess of the product; these include cream, condensed whole milk, evaporated milk, frozen milk, frozen cream, ice cream, etc. Other usable protein sources include the casein fraction of milk, noncasein proteins, sodium caseinate, lactalbumin, lactoglobulin, and the proteose-peptone fraction of skim milk.

Other protein materials are gluten, soybean flour, yeast, gelatin, isolated soy proteins including partially degraded soy proteins, egg white, egg yolk, and albumen. The gluten is preferably wheat gluten because of its commercial availability, although rye or corn gluten may be used. In general, any cereal-derived gluten having an amino acid content and distribution similar to wheat gluten is suitable. If desired, combinations of wheat flour and rye flour, or the glutens derived from them, may be used. The gluten may be vitalized or devitalized, preferably the former, by which is meant undenatured or unmodified gluten, that is, one that has not been subjected to high heat for any considerable period of time such as would denature the protent content. The vitalized gluten tends to hold together the other ingredients. By "gluten," as used herein, is meant not only gluten per se but also a gluten-containing material.

The soybean flour is preferably any clean, essentially bland material which has been solvent extracted in a conventional manner. The soy flour may be substituted in whole or part by defatted cottonseed flour, defatted fish flour, or other suitable high protein defatted flour or animal, vegetable, or fish origin.

The albumen is preferably obtained from eggs, but sources such as milk, fish, elastin, etc. are suitable. Other useful materials can be obtained from sources such as fish muscle, blood, and certain vegetable proteins. To facilitate handling, the albumen is employed in dehydrated form. Still other usable protein sources are animal protein flour, as derived from beef, pork and other meats, and fish protein flour.

The protein-containing foamable material may comprise about 3 to 15%, and suitably 5 to 10 or 11%, by weight of the food product.

The foamable agent may be an edible surface active compound, particularly fatty acid esters, including monoesters and diesters, of glycol, glycerol, sorbitol, sorbitan, and other polyhydric alcohols. The acid may be a monocarboxylic aliphatic, saturated or unsaturated, straight or branched chain fatty acid, preferably having from 12 to 18 carbon atoms. Examples are glycerol mono- and dilaurates, glycerol mono- and dioleates, glycerol mono- and distearates, glycerol monopalmitate, glycerol monomyristate, propylene glycol monostearate, propylene glycol monopalmitate, propylene glycol monooleate, and mixtures thereof. Also, sorbitan monostearates and other sorbitan fatty acid esters; polyoxyethylene stearates; polyoxyethylene sorbitan fatty acid esters; glyceride esters of fully hydrogenated lard, etc. These surface active agents may be used in concentrations of 0.05 or 0.1 to 1, 2, 5 or even 10% by weight of the product. Long chain organic acids and their salts are useful, such as sodium palmitate, sodium stearate, sodium oleate, or mixtures thereof. Also of value are long chain alcohols.

Still other useful foamable agents may be chosen from gums such for instance as carrageenin, tragacanth, arabic, ghatti, and karaya gums; seaweed colloids such as agar, carrageen and sodium alginate; seed extracts such as locust bean, quince and guar; starches and starch derivatives, like converted starches; water-dispersible cellulose derivatives such as sodium carboxymethylcellulose; pectins such as apple pectin and citrus pectin; and modified pectins such as low methoxy pectins. Propylene glycol alginate, glycerol, and stearic acid mono- and diglycerides are also useful. If desired, citrate and/or phosphate salts may be used with any of the foregoing, all of which are usually classed as protective colloids. These film-forming colloids also function as texture-varying agents, serving to vary the texture or mouth feel of the resulting mix, it being thus possible to increase the smoothness, or impart a slightly firmer consistency, etc. The amount of such colloid may range from a tenth to a few percent, say from 0.1 to about 5%, preferably 0.1 to 2 or 3% by weight of the product.

Other useful foamable agents are esters of polyols like sorbitol, glycerol, mannitol, and polyoxyethylene glycols, wherein the acid moiety of the ester preferably is a 12 to 18 carbon atom fatty acid, as illustrated by such esters as sorbitan laurate, sorbitan mono- and tristearates, sorbitan mono- and trioleates; mannitan stearates, palmitates, and laurates; mono-, di-, and triglycerides of fatty acids like oleic, palmitic, and stearic; glycerol sorbitan laurate; also polyoxyethylene laurates, stearates, oleates, and palmitates; and polyoxyethylene sorbitan palmitates, oleates, stearates, and laurates. Other polyol esters include diglycol laurate, diglycol stearate, and diglycol oleate; also the stearates, oleates, and laurates of propylene glycol. Sucrose mono- and dipalmitates are suitable, as well as other mono-and diesters of sucrose and fatty acids of, preferably, at least 12 carbon atoms, including sucrose monolaurate, sucrose monostearate, sucrose monooleate, sucrose dilaurate, sucrose dimyristate, sucrose distearate, sucrose dioleate, and the like. Other agents are polyoxyethylene glycols and ether derivatives thereof such as the alkyl and alkyl aryl ethers; also methoxy polyoxyethylene glycols and their ester derivatives. Certain cellulose derivatives are useful, including methyl cellulose ether, ethyl cellulose ether, hydroxypropyl cellulose ether, mixed methyl-hydroxypropyl cellulose ether, hydroxyethyl cellulose ether, etc.; also dextrans and derivatives thereof; dextrins. Still other agents are water-soluble organic alginates such as propylene glycol alginate; lecithin; chocolate, cocoa, cacao butter. Other agents may include suitable alkyl and aryl glycosides; oligosaccharides; and polysaccharides.

The foaming agents described above may be used alone or in various mixtures comprising two or more agents. Some give stable foams by themselves, while others function better in this respect in conjunction with another agent such as, say, one from the above described surface active group of agents. In this connection, as noted, the crystallite aggregates act to stabilize the foams as well as to reduce the calorie value of the resulting food. The aggregates also whiten the food, impart to it a degree of texture, enhance its moldability.

If desired, the aggregates may be incorporated in conventional commercial toppings and other foamable foods wherein they may reduce the calorie value of the resulting mix and increase its foam stability. It will be understood that by foam stability is means stability for a reasonable or practical period of time, at least, say, for the duration of the average meal.

Butterfat is a conventional lipid or fat-supplying or creaming agent and is usually obtained from cream, frozen cream, or butter. Other useful edible fats include partially hydrogenated cottonseed oil, refined coconut oil, soybean oil, oleomargarine, lard, peanut oil, butter oil, corn oil, palm oil, etc. The amount of lipid material is variable, depending on the degree of creaminess desired in the topping and on the calorie content. Where the latter is not a factor, the lipid content may be up to 15 or 20% by weight, but where calorie value is important, no lipid at all need be used, or at best very little, say 1 to 3% by weight. By creaming agent is meant a material which will give the topping or other food product a rich creamy mouth feel.

Any conventional flavor material is suitable; for example, vanilla, vanillin, chocolate, fruits, fruit extracts, nuts, etc., as obtained from conventional sources. The amounts may vary from 0.05 to 2%, preferably 0.2 to 1%, by weight of the food.

Sweetening agents include sucrose, dextrose, lactose, glucose, galactose, etc. They may be used in such conventional forms as cane sugar, beet sugar, corn syrup, brown sugar, maple sugar, maple syrup, honey, molasses, etc. Invert sugar is useful. These conventional sugars may be employed in conventional amounts, say from 5 or 6% to 15, 16, or even 20%, by weight. Other sweetening agents are glycerol, sorbitol, mannitol, and similar polyols. Mixtures of two or more of the foregoing are suitable. In place of all or part of the sugar, non-caloric sweetener compositions can be added, such as cyclamate or saccharin, in low concentrations, say 0.01 to 0.5% by weight. The cyclamate can be any of the salts of N-cyclohexylsulfamic acid or the acid itself. Of the salts, it is preferred to use an alkali salt, i.e., an alkali metal or alkaline earth metal salt such as sodium, potassium, magnesium, calcium, or ammonium cyclamate and the like. Sorbitol can also be added to these sweetening agents, although it is nutritive. Mixtures of cyclamate and saccharin can be substituted for the cyclamate, keeping in mind that saccharin is about 10 times sweeter than cyclamate. As an example, an alkali cyclamate such as sodium or calcium cyclamate may be mixed with saccharin in a cyclamate: saccharin weight ratio of 10:1. Other suitable non-nutritive sweetening agents comprise glucose polymers derived from starch by depolymerization followed by heat polymerization, as described in United States Patent No. 2,563,014.

If desired, some components, such as oily or fatty materials, may be introduced into the product mix by means of a carrier in which they are soluble, such as propylene glycol, in amounts, say, from 1 or 2 to 5% by weight, food basis. Where the carrier is not wanted, the oily or fatty component may simply be melted and added to the mix in the liquid state.

Specific methods of preparing the toppings or other foamable foods are illustrated in the examples below. In general, a useful method comprises attriting the crystallite aggregates in a suitable device or mixer, blending into the mixer, with agitation, ingredients like the sugar, water, surface active agent in melted form or dissolved in a carrier, and flavor, and then homogenizing the mix. Another method comprises blending all the ingredients except the aggregates in a separate mixer and then adding the same to the attrited aggregates in the attriting device, blending the over-all mix, and then homogenizing it. Or the aggregates and water may be first homogenized, then the remaining ingredients may be blended and homogenized, and the two homogenized mixtures blended.

A particularly useful preparative method is to mix all the oily or fatty materials and, if necessary, to melt them together to place them in a liquid state; then the dry aggregates are added, with stirring, to obtain a substantially dry, free-flowing mixture. Sugar and flavor may be incorporated in the latter, while preserving its dry, free-flowing form. At this point the mix is in a suitable condition for packaging in conventional paper and/or paperboard cartons or containers, with or without suitable liners. In effect, the mix is apparently dry, although actually the liquid ingredients therein are sorbed, that is, adsorbed and/or absorbed, by the aggregates. Upon the addition of an aqueous liquid, such as water, milk, skim milk, etc., to the dry mix followed by homogenization and cooling, foamed toppings or other preparations may be produced either by means of aerosol dispensers or by beating or whipping in ordinary household whipping devices.

Whatever method is used, the resulting mix is a more or less viscous but flowable suspension. It may be foamed in any desired way, including manual whipping or beating as by means of an egg beater or other conventional household device, but preferably the mix is placed in a pressure-dispensing container from which it may be removed in aerated form. Desirably, the mix is cooled before dispensing to get an improved taste and better gas retention. The propellant for the pressure container may be any conventional non-toxic, odorless, tasteless gas, including nitrogen, nitrous oxide, carbon dioxide, dichlorodifluoromethane (Freon), mixtures of nitrous oxide and carbon dioxide, mixtures of perfluorocyclobutane with any of the foregoing, etc.

These containers, conventionally known as aerosol dispensers, may have a dispensing orifice of 0.025 inch diameter or less. Despite the small size of the surface, the topping mix is able to pass therethrough and to be aerated during such passage.

Foamed products are obtainable having a smooth rich texture at least comparable to commercial products and an aerated structure superior thereto in point of stability or stand-up. The aggregates help to whiten the topping and also give body to it, rendering it suitable for dispensing by pressure dispensers in a desirable fluffed or aerated form. The topping is adaptable to shaping by the dispensing valve or sleeve or other outlet device of the container. Toppings of substantially reduced calorie value, and acceptable from every standpoint, particularly in respect of their creamy, chiffon-like or fluffy mouth feel, are provided by the invention; and as shown in the examples, toppings of negligible calorie value may be made. Non-dairy toppings are also provided, these containing no milk or milk products.

Besides toppings, other edible whippable or foamable products preparable by means of the aggregates are cheese whips and salad dressings, the latter being suitable, say, for decorating dessert fruits. As will be shown, these preparations may comprise, in addition to the aggregates, a foamable material and a flavor. In the cheese whip the foamable agent may comprise the protein present in the cheese, while in the salad dressing it is the egg protein. Dips may be made by adding a suitable flavor, such as onion, mustard, cheese, garlic, potato, and the like, to any of the topping preparations. Other foamable products are frappes, meringues, and aerated icings for baked goods.

The invention may be illustrated by the following examples.

*Example 1*

Cellulose crystallite aggregates were prepared by hydrolyzing Ketchikan sulfite wood pulp with a 0.5% by weight aqueous solution of HCl for 45 minutes at 250° F., there being obtained a never dried material having an average level-off D.P. of 235, a moisture content of 68.5%, and a particle size distribution in the range of 1 to 250 or 300 microns. This material was then made up into an aqueous mixture comprising 32% by weight of the aggregates and the balance water, and the mixture subjected to attrition for 15 minutes in a Model N-50, variable speed, Hobart Mixer. This device was equipped with a stationary metal bowl in which a substantially flat metal paddle or beater was adapted both to rotate and to revolve; the beater had a compound action, revolving inside the bowl and rotating on its axis, with the direction of rotation being opposite the direction of movement around the bowl. The beater comprises a tapered stem having a plurality of spaced arms extending angularly downwardly from opposite sides. A substantially V-shaped member connected the outer ends of the arms; in effect, the beater resembled an inverted tree. The mixer was driven by a one-sixth horsepower motor and was operated at a speed of 61 r.p.m. The resulting product was a smooth gel containing 32% of aggregates.

Two toppings were made up, identified as L and M in the following table, from which it will be seen that L contains crystallite aggregates while M does not, and that L contains only half as much milk-solids-not-fat (MSNF) as M. Otherwise, the toppings are the same.

|  | L | | M | |
|---|---|---|---|---|
|  | gms./batch | Percent | gms./batch | Percent |
| Aggregates | 50.00 | 10.00 | | |
| MSNF | 50.00 | 10.00 | 100.00 | 20.00 |
| Sucrose | 50.00 | 10.00 | 50.00 | 10.00 |
| Water | 331.50 | 66.30 | 331.50 | 66.30 |
| Propylene glycol | 12.50 | 2.50 | 12.50 | 2.50 |
| GMS | 5.00 | 1.00 | 5.00 | 1.00 |
| Vanilla extract | 1.00 | 0.20 | 1.00 | 0.20 |

To prepare L, the sugar was dissolved in water and slowly added to the aggregates gel in the Hobart, with mixing. The glyceryl monostearate (GMS) was dissolved in warm propylene glycol and added to the mixture in the Hobart. Then the milk solids and the vanilla were added and the mix blended for about 5 minutes, after which it was homogenized in a single stage homogenizer of the piston-orifice type wherein the mix is forced through small orifices at about 1,000 p.s.i. Thereafter the homogenized mix was loaded into a conventional nitrous oxide-charged aerosol pressure can for dispensing whipped cream. The can was cooled in a refrigerator. Topping M was prepared in substantially the same way, except of course that no aggregates were used.

Upon dispensing both toppings from their containers, the following observations were made. Topping L produced a firm foam with good stand-up quality; it had an acceptable taste, a light mouth feel, and was judged suitable for many foods. The taste exhibited a marshmallow note. Topping M gave a foam with poor stand-up, as indicated by its quick collapse; its appearance and mouth feel were very light, although the taste was good. Topping L had a viscosity of 85 Brookfield units, and M a viscosity of 12 Brookfield units.

*Example 2*

Crystallite aggregates were prepared as in Example 1 and had an average level-off D.P. of 230 and a moisture content of 64% by weight. They were attrited in their never dried state for 1 hour in a stainless steel sigma blade mixing device. This comprised a rectangular-shaped compartment having an open top and provided at the bottom with two side-by-side concave portions separated by an upstanding ridge. A sigma blade was adapted to rotate in each concaved portion, one end of each blade being mounted to a side of the compartment and the other end being unmounted but disposed closely to the opposite side of the compartment. The clearances of the blades with the end surfaces of the compartment and with the surfaces of the concave bottom portions were very small, being of the order of a few thousandths of an inch, say about eight-thousandths inch. The blades were power driven and were fully rotary while the compartment was stationary. The attriting action of the device upon the aggregates was in the nature of a rubbing or smearing one, the aggregates becoming lodged in the small clearances noted and being carried around within the compartment in a rotary manner by the motion of the blades. The aggregates after attrition were in the form of a fairly firm, cohesive dough.

A whipped topping was prepared having the following composition:

|  | Grams/Batch | Percent |
|---|---|---|
| Aggregates | 45.00 | 9.00 |
| MSNF | 40.00 | 8.00 |
| Sucrose | 50.00 | 10.00 |
| Water | 357.50 | 71.50 |
| GMS | 5.00 | 1.00 |
| Vanilla extract | 1.00 | .20 |
| CMC | 1.50 | .30 |
|  | 500.00 | 100.00 |

In preparing the topping, the attrited aggregates in dough form were well dispersed in the Hobart mixer with 103 ml. of water. The sugar and CMC (carboxymethylcellulose) were dispersed in a Waring Blendor with the remaining water (174.5 ml.), and this mixture was slowly added to that in the Hobart. The resulting mixture was heated over an open flame to about 80° C. and then, while constantly stirring, the pre-melted GMS (glyceryl monostearate) was slowly added. The milk solids and vanilla were also blended in at this point. The mix was then homogenized while still warm, cooled to room temperature, loaded with a pressure can, charged with nitrous oxide, and then chilled in the refrigerator. The dispensed topping foam had very good stand-up qualities and also excellent taste and texture. It was allowed to stand for two hours, during which time no weeping was observed and very little collapsing.

*Examples 3–5*

Using never dried, attrited cellulose crystallite aggregates in dough form, as prepared in Example 2, three toppings, identified as Z, AA, and BB, were prepared in which the milk solids were omitted and soy used as a source of protein. They had the following compositions:

|  | Z, percent | AA, percent | BB, percent |
|---|---|---|---|
| Aggregates | 9.00 | 9.00 | 9.00 |
| Soy protein | 5.00 | 3.00 | 5.00 |
| Sucrose | 12.00 | 12.00 | |
| Monoglycerides | 3.00 | 3.00 | 3.00 |
| Water | 70.70 | 57.70 | 82.54 |
| CMC | 0.30 | 0.30 | 0.30 |
| Coconut fat | | 15.00 | |
| Saccharin | | | 0.015 |
| Calcium cyclamate | | | 0.15 |

The soy protein was a sodium proteinate prepared from an edible isolated soy protein. The proteinate was water dispersible and comprised about 85% protein, about 1.2% sodium, and the balance was moisture, ash, fiber, fat, etc. The monoglycerides comprised esters prepared from fully hydrogenated lard and purified by molecular distillation; they had a melting point range of 68 to 70° C. The coconut fat melted at 98 to 103° F.

For topping Z, the aggregates were dispersed in 100 ml. of water in the Hobart mixer. The sugar, soy protein, and CMC were dispersed in the remaining water (total of 353.5 ml.) in the Waring Blendor and the mixture slowly added to the dispersion of aggregates. The resulting mixture was heated to 80° C., and the pre-melted monoglycerides were blended in. The mix was then homogenized, cooled to room temperature, and placed in the pressure container; the latter was then charged with nitrous oxide, chilled, and the topping then tested. It produced a foam which had excellent stand-up and texture.

Topping AA was prepared in substantially the same way as topping Z. When tested, it gave a foam having excellent stand-up and excellent texture. Its taste was judged to be better than Z, owing to the presence of the coconut fat, which enhanced its creaminess. Its appearance was excellent.

Topping BB was also prepared in substantially the same way as Z. It gave a foam having excellent stand-up and texture and a very good taste. Artificial sweeteners replaced the sugar. This topping had a calorie value of less than 0.5 calorie per gram and was judged suitable as a dietetic topping. Owing to the absence of milk solids, it was not a dairy product; this was also true of toppings Z and AA.

*Example 6*

The following ingredients were used to make up a topping:

|  | gms./batch | Percent |
|---|---|---|
| Aggregates | 45.00 | 9.00 |
| MSNF | 40.00 | 8.00 |
| Sucrose | 50.00 | 10.00 |
| Water | 358.50 | 71.70 |
| Monoglycerides | 5.00 | 1.00 |
| CMC | 1.50 | 0.30 |

The aggregates were prepared as in Example 2; they were dispersed slowly in the Hobart mixer with 175 ml. of distilled water and the mixture then homogenized. The milk solids, sugar, and CMC were dry blended, dispersed by hand stirring in 103.5 ml. of water, heated to 80° C., mixed with the pre-melted monoglycerides, and the resulting mixture homogenized. The two homogenized batches were then blended and cooled, forming a batch having a Brookfield viscosity of 32. (By contrast, a batch prepared by mixing all ingredients and then homogenizing had a viscosity of 72.) When loaded into a pressure can, cooled, and tested, the topping was judged to be on a par with topping AA of Examples 3–5. The reduced viscosity of the batch, prior to filling the aerosol can, made the batch more flowable and easier to load into the can.

*Example 7*

A reduced calorie cream salad dressing was prepared having the following composition:

|  | gms./batch | Percent |
|---|---|---|
| Aggregates | 100.00 | 9.09 |
| Sugar | 75.00 | 6.82 |
| Salt | 14.40 | 1.31 |
| Mustard | 1.60 | 0.15 |
| Monosodium glutamate | .10 | .01 |
| Celery salt | .40 | .04 |
| Refined cottonseed oil | 70.00 | 6.36 |
| Egg yolk (fresh) | 16.00 | 1.45 |
| Vinegar | 90.00 | 8.18 |
| Lemon juice | 15.00 | 1.36 |
| GMS | 12.00 | 1.09 |
| CMC | 4.00 | 0.36 |
| Water | 701.50 | 63.77 |

The aggregates were prepared as in Example 2, were mixed with part of the water, and homogenized. The sugar, salt, mustard, glutamate, celery salt, oil, egg yolk, vinegar, and lemon juice were blended in the Hobart, then heated, and the premelted GMS added, after which the mix was homogenized. The two homogenates were mixed, placed in an aerosol container, chilled, and tested. The resulting foamed product exhibited very good stand-up, and had good texture and taste. It was suitable for use on fruit salad or even in sandwiches.

*Example 8*

A whipped cheese topping was prepared using the following ingredients:

|  | gms./batch | Percent |
|---|---|---|
| Aggregates | 36.00 | 9.00 |
| Cheddar cheese | 80.00 | 20.00 |
| Salt | 0.40 | 0.10 |
| Water | 278.00 | 69.50 |
| GMS | 4.00 | 1.00 |
| CMC | 1.60 | 0.40 |
|  | 400.00 | 100.00 |

In preparing the topping, the attrited aggregates in dough form, as prepared in Example 2, were well dispersed in the Hobart mixer with 150 ml. of water and the CMC, and then homogenized. The cheese and 70 ml. of water were mixed in the Hobart to break down the cheese, then heated until the cheese melted, the premelted GMS and the salt added, and the mixture homogenized. The two homogenized mixes were blended, loaded into an aerosol can, chilled, and the topping dispensed and examined. The foam so produced had good stand-up, taste, and texture, and was appropriate as a dip for snacks, a topping for baked potatoes, or an addition for casserole dishes and souffles.

*Example 9*

A topping was made up from the following:

|  | gms./batch | Percent |
|---|---|---|
| Aggregates | 55.00 | 11.00 |
| Soy protein | 35.00 | 7.00 |
| Sucrose | 60.00 | 12.00 |
| Water | 348.00 | 69.60 |
| Alginate | 2.00 | 0.40 |

The aggregates were prepared by hydrolyzing Ketchikan sulfite wood pulp with a 0.5% by weight aqueous solution of HCl for 55 minutes at 250° F., there being obtained a never dried material having an average level-off D.P. of 20. This was spray dried to a moisture content of 3% by weight. The aggregates, soy protein, sugar, and alginate (propylene glycol alginate) were dry blended and then whipped in the Hobart mixer, while the water was added, using a wire whip in the form of a pear-shaped cage to beat the mix. After about 4 minutes of whipping, a foam appeared. The foam was slightly heavier than required but had a good texture and acceptable taste. A note of marshmallow was detectable.

*Example 10*

The following non-protein formulation was made up:

|  | gms./batch | Percent |
|---|---|---|
| Aggregates | 45.00 | 9.00 |
| Sucrose | 50.00 | 10.00 |
| Water | 350.00 | 70.00 |
| Polyoxyethylene sorbitan tristearate | 5.00 | 1.00 |
| GMS | 15.00 | 3.00 |
| Lemon juice | 5.00 | 1.00 |
| Corn oil | 30.00 | 6.00 |

The aggregates were never dried attrited material as used in Example 2; they were mixed with the corn oil in the Hobart mixer, and thereafter the tristearate was blended in to produce an emulsified mixture. The sugar and lemon juice were dissolved in the remaining water and added to the foregoing mixture, it was then heated at 80° C. and the premelted GMS blended in. The entire mix was then homogenized, cooled to room temperature, and placed in an aerosol pressure can. This mixture produced a foamed topping which was judged to be acceptable, although the ribbon extruded from the can was not sharply defined.

*Example 11*

A whipped topping was prepared having the following composition:

|  | gms./batch | Percent |
|---|---|---|
| Aggregates | 45.00 | 9.00 |
| Soy protein | 15.00 | 3.00 |
| Sucrose | 60.00 | 12.00 |
| Water | 363.50 | 72.70 |
| GMS | 15.00 | 3.00 |
| CMC | 1.50 | .30 |
|  | 500.00 | 100.00 |

The aggregates were prepared by hydrolyzing Ketchikan sulfite wood pulp in a 0.5% by weight aqueous HCl solution at 250° F. for 1 hour, the average level-off D.P. being 230. The never-dried aggregates (moisture content, about 65% by weight) were not attrited, but instead were diluted with water to 13.6% solids content and then spray dried, using an air inlet temperature of about 600° F. The resulting dried product had a moisture content of 4.6% by weight, and was taken for use.

The dried aggregates were well dispersed in the Hobart mixer with 138 ml. of water. The soy protein, sucrose and CMC were dry blended and then dispersed in a Waring Blendor with the remaining water, and this mixture was slowly added to that in the Hobart. The resulting mixture was heated to about 80° C. and then, while stirring, the pre-melted GMS was slowly added. The mix was homogenized while still warm, cooled to room temperature, cream flavoring added, the mix then loaded into a pressure can, and charged with nitrous oxide. The mix had a Brookfield viscosity of 15 and was quite fluid, which was judged an advantage. The foam was easily dispensible, had very good stand-up qualities, excellent taste, and an excellent, light texture. The foam had a creamy appearance.

*Example 12*

A topping was prepared using commercial margarine as the foamable material. Surface active agents were added, even though the margarine contained its own such agents. The formulation was as follows:

|  | gms./batch | Percent |
|---|---|---|
| Aggregates | 45.00 | 9.00 |
| Margarine | 50.00 | 10.00 |
| Sucrose | 50.00 | 10.00 |
| Water | 334.50 | 66.90 |
| Polyoxyethylene sorbitan tristearate | 0.50 | 0.10 |
| GMS | 15.00 | 3.00 |
| Lemon juice | 5.00 | 1.00 |

The margarine (Imperial brand) comprised partially hardened soybean and cottonseed oils, skim milk, non-fat dry milk, water, butter, salt, mono- and diglycerides, lecithin, sodium benzoate, carotene, artificial flavor, and vitamins A and D. The aggregates, which had been prepared as in the preceding example, were dispersed in the Hobart with 138 ml. of water. Then the margarine was melted, dispersed in the remaining (heated) water, using a Waring Blendor, and the sugar, lemon juice, and tristearate added thereto; the resulting mixture was then blended into the aggregates in the Hobart. The mix was heated to 80° C., the pre-melted GMS added, the mix homogenized, cooled to room temperature, flavored with 1 drop of cream flavor, and charged to an aerosol can. The mix was quite fluid, having a viscosity of 10 Brookfield units, and was easily dispensed from the can in the form of a w ell-defined ribbon which retained its "peak." The foam was very attractive and coherent, had an outstanding creamy taste, a light excellent texture, and excellent form retention.

The foregoing preparation was repeated, except that the mixing procedures were changed. Thus, the margarine, tristearate, and GMS were first melted together and placed in the Hobart. The dried aggregates were added slowly to the Hobart, with mixing forming a substantially dry free-flowing mix. Then the sugar was added, followed by the lemon juice. At this point the mix was of such dry, free-flowing form that it was considered to be packageable in suitable paper cartons or containers. The water was then heated and added, with mixing. Then the entire mix was heated slightly, homogenized, cooled to room temperature, and charged to the aerosol can. The resulting foam was like that described in the preceding paragraph.

*Example 13*

A topping was prepared using only the aggregates, water, and surface active agents. The formulation was as follows:

|  | Percent |
|---|---|
| Aggregates | 9.00 |
| Polyoxyethylene sorbitan tristearate | 0.10 |
| GMS | 3.00 |
| Water | 87.90 |
|  | 100.00 |

The aggregates, which had been prepared as in Example 11, were dispersed in the Hobart with 138 ml. of water. Then the tristearate was dispersed in the remaining (heated) water using a Waring Blendor, and the resulting mixture was blended into the aggregates in the Hobart. The mix was heated to 80° C., premelted GMS added, the mix homogenized, cooled to room temperature, and charged to an aerosol can. The mix was quite fluid and easily dispersed from the can in the form of a sharply-defined, coherent ribbon. A pyramid was built up which retained its form quite well. Although the foam was unflavored and unsweetened, it yet had an agreeable taste and a fluffy chiffon-like mouth feel.

It is to be understood that the invention is not restricted to specific details of the foregoing description but is capable of obvious variations without departing from its scope.

In the light of the foregoing description the following is claimed.

We claim:

1. An aqueous foamable composition maintained under pressure greater than atmospheric comprising a foamable material, level-off D.P. cellulose in the form of small disintegrated aggregates of crystals at least 1% by weight of the aggregates having a particle size less than one micron, the D.P. cellulose being present in an amount that is at least 1% of the weight of the foamable material, and a material that is in a gaseous state at atmospheric pressure.

2. An edible aqueous foamable composition maintained under pressure greater than atmospheric comprising a foamable material, level-off D.P. cellulose in the form of small disintegrated aggregates of crystals at least 1% by weight of the aggregates having a particle size less than one micron, the D.P. cellulose being present in an amount that is at least 1% of the weight of the foamable material, and a material that is in a gaseous state at atmospheric pressure.

3. An edible aqueous foamable composition maintained under pressure greater than atmospheric comprising a proteinaceous foamable material, level-off D.P. cellulose in the form of small disintegrated aggregates of crystals at least 1% by weight of the aggregates having a particle size less than one micron, the D.P. cellulose being present in an amount that is at least 1% of the weight of the foamable material, and a material that is in a gaseous state at atmospheric pressure.

References Cited in the file of this patent

UNITED STATES PATENTS

| | | |
|---|---|---|
| 2,846,314 | Aichele et al. | Aug. 5, 1958 |
| 2,952,547 | Hill | Sept. 13, 1960 |
| 2,970,918 | Petersen | Feb. 7, 1961 |

OTHER REFERENCES

"Crops in Peace and War," The Yearbook of Agriculture, 1950–1951, U.S. Dept. of Agriculture, pp. 793–797.

UNITED STATES PATENT OFFICE
CERTIFICATE OF CORRECTION

Patent No. 3,067,037                      December 4, 1962

Carl T. Herald et al.

It is hereby certified that error appears in the above numbered patent requiring correction and that the said Letters Patent should read as corrected below.

Column 6, line 35, for "or", second occurrence, read -- of --; column 7, line 59, for "means" read -- meant --; column 10, line 44, for "rectangular" read -- rectangularly --; column 11, line 12, for "with", first occurrence, read -- into --; column 13, line 19, for "20" read -- 220 --; column 14, line 47, for "ofa well-defined" read -- of a well-defined --.

Signed and sealed this 25th day of June 1963.

(SEAL)
Attest:

ERNEST W. SWIDER
Attesting Officer

DAVID L. LADD
Commissioner of Patents